(12) United States Patent
Schneider et al.

(10) Patent No.: US 8,069,689 B2
(45) Date of Patent: Dec. 6, 2011

(54) PROCESS AND DEVICE FOR PRODUCING FIRE-POLISHED GOBS

(75) Inventors: Klaus Schneider, Mainz (DE); Peter Durolf, Grunberg (DE); Christian Schenk, Ingelheim (DE); Bernd Loffelbein, Saulheim (DE); Ralf Reiter, Mainz-Kastel (DE)

(73) Assignee: Schott AG, Mainz (DE)

( * ) Notice: Subject to any disclaimer, the term of this patent is extended or adjusted under 35 U.S.C. 154(b) by 642 days.

(21) Appl. No.: 11/184,334

(22) Filed: Jul. 19, 2005

(65) Prior Publication Data

US 2006/0026993 A1  Feb. 9, 2006

(30) Foreign Application Priority Data

Jul. 19, 2004  (DE) .......................... 10 2004 034 797

(51) Int. Cl.
*C03B 40/02*  (2006.01)
(52) U.S. Cl. ............. 65/25.1; 65/182.2; 65/126; 65/127
(58) Field of Classification Search .................. 65/25.1, 65/182, 182.2, 126.127
See application file for complete search history.

(56) References Cited

U.S. PATENT DOCUMENTS

| | | | |
|---|---|---|---|
| 5,762,673 A | 6/1998 | Hirota et al. | |
| 2002/0062660 A1 | 5/2002 | Yoshikuni et al. | 65/25.1 |
| 2003/0038386 A1* | 2/2003 | Parayre et al. | 261/122.1 |
| 2004/0025538 A1* | 2/2004 | Kunert et al. | 65/102 |
| 2004/0237592 A1 | 12/2004 | Iguchi et al. | |

FOREIGN PATENT DOCUMENTS

| | | |
|---|---|---|
| DE | 2410923 | 9/1974 |
| JP | 05097447 A * | 4/1993 |
| JP | 6340434 | 12/1994 |
| JP | 08319124 | 12/1996 |
| JP | 08325021 | 12/1996 |
| JP | 09221328 | 8/1997 |
| JP | 10139465 | 5/1998 |
| JP | 11116252 | 4/1999 |
| JP | 11322348 | 11/1999 |
| JP | 11322349 | 11/1999 |
| JP | 2000001320 | 1/2000 |
| JP | 2000001321 | 1/2000 |
| JP | 2000154027 | 6/2000 |
| JP | 2002068757 | 3/2002 |
| JP | 2002097023 | 4/2002 |
| JP | 2002128533 | 5/2002 |
| JP | 2002173328 | 6/2002 |
| JP | 2003048745 | 2/2003 |
| JP | 2005306735 | 11/2004 |
| JP | 2003081652 | 3/2006 |
| WO | WO 03/031358 | 4/2003 |

OTHER PUBLICATIONS

Machine translation of JP 09-221328 Tomita et al. Production of Optical Element and Apparatus for Production Thereof, Aug. 26, 1997.* Office Action dated Jul. 21, 2009 corresponding to Japanese Patent Application No. 2005-208565.
Office Action dated Apr. 10, 2009 for parallel Chinese Application No. 200510167207 (with English translation).

* cited by examiner

*Primary Examiner* — Queenie Dehghan
(74) *Attorney, Agent, or Firm* — Ohlandt, Greeley, Ruggiero & Perle, LLP

(57) ABSTRACT

A levitation process for producing fire-polished gobs is provided. The process includes feeding a glass slug into a levitation mold and reducing a through-flow of the fluid between the glass slug and the levitation mold. The levitation mold includes a membrane of a porous material.

24 Claims, 2 Drawing Sheets

PROCESS AND DEVICE FOR PRODUCING FIRE-POLISHED GOBS

CROSS-REFERENCES TO RELATED APPLICATIONS

The present application is claiming priority of German Patent Application No. 10 2004 034 797.2-45, filed on Jul. 19, 2004, the content of which is herein incorporated by reference.

BACKGROUND OF THE INVENTION

1. Field of the Invention

The invention relates to a levitation process and device for producing fire-polished gobs from low-viscosity glass, which are used in particular as preforms for the production of precise-pressed optical components with high-quality optical properties.

2. Description of Related Art

It is known to precise-press preshaped glass slugs (referred to below as gobs) to produce optical components with high-quality optical properties and a highly accurate surface structure and quality, for example for the production of refractive and diffractive components and lenses, in particular aspherical lenses.

Precise-pressing obviates the need for time-consuming and expensive milling, grinding and polishing for precise formation of at least one surface of the optical component. Precise-pressing is generally effected by reheating the gob and pressing it into high-quality molds. This procedure is used in particular if the milling, grinding and polishing to form relatively complicated surface structures of the component would be difficult and laborious.

High demands are imposed on the homogeneity and surface quality of the gob, since defects in the gob are transferred to the end product and lead, for example, to imaging distortions. This would mean that the end product would no longer be usable.

The gobs are usually obtained direct from the glass melt, by cooling a glass slug which has been fed into a mold without direct contact with a mold surface, giving the gobs what is known as a fire-polished surface.

In this context, production is effected using the levitation process, in which a gas cushion is built up between the glass slug which has been fed in and the mold, so that direct contact is avoided. The mold is designed as what is known as a levitation mold, i.e. is permeable to gas, so that a suitable volumetric flow of gas can emerge at the mold surface. The molten glass, which has been fed in portions into the levitation mold, cools down in the levitation mold and, under the surface tension forces of the glass, the force of gravity and pressure of the gas cushion which forms between the mold surface and the glass slug, adopts approximately the shape of the mold, while the gas cushion prevents it from touching the mold.

By way of example, to feed the glass slug into the levitation mold, it is known for a glass slug which has been portioned by means of a needle feeder to be caught in the levitation mold through which gas is flowing. During the filling operation, the levitation mold is moved downward, in such a manner that the distance between the top side of the glass slug and the feeder nozzle remains constant. When the needle closes, the glass slug at the end of the feeder contracts and becomes detached. To assist with this detachment, the levitation mold can be moved downward at an increased velocity.

It has long been known to use the levitation process to produce fire-polished gobs and to process them further by precise-pressing. A corresponding process and molds which are suitable for carrying out the process are described, for example, in DE-C 24 10 923.

However, the procedure has proven extraordinarily complicated, in particular for low-viscosity glasses, on account of the complex properties of the glass, in particular during the infeed and cooling process.

The procedure involved in producing the gob is substantially dependent on the quantity of the glass slug, the shape of the gob to be produced and the viscosity properties of the glass. Problems arise in the procedure both when the glass slug is being fed into the mold, during optimum production and setting of the gas cushion required and also with regard to the control of the profile of the cooling and shaping process. An imbalanced procedure leads to gobs of reduced quality, with bubbles, cords, surface defects and/or cooling waves.

To improve the procedure when feeding in the glass and shaping the gob, it is proposed in US 2002/0062660 A1 that the flow rate of the gas be controlled in a targeted manner to produce an optimum gas cushion. In a first step, a molten glass slug flowing downward is caught in a levitation mold, in a second step the mold is moved downward at an increased velocity (higher than the flow rate of the glass slug flowing downward), and in a third step the glass slug which has been fed in is shaped on a gas cushion. The first step is carried out at a lower gas flow rate than the flow rate in the third step; the flow rate in the first step may even be zero.

However, with a procedure of this type, the glass slug can come into contact with the mold while it is being fed in, which leads to a reduced quality, i.e. to cooling waves and surface defects in the gobs. Moreover, during a procedure of this type glass can stick to the mold, locking the openings in the mold. Consequently, the molds can no longer be used or at least have to be laboriously cleaned.

BRIEF SUMMARY OF THE INVENTION

Therefore, the invention is based on the object of further improving the quality of the gobs and making the production process more effective.

The object is achieved by a process and a device as provided by the present invention.

The process according to the invention for producing fire-polished gobs is a levitation process and comprises the steps of:
feeding a molten glass slug into a first mold half, which is permeable to fluids,
cooling the glass slug in the first mold half,
with a first fluid cushion being produced between the first mold half and the glass slug, by passing a fluid through the first mold half, while the glass slug is being fed in and cooled,
the through-flow of fluid between the glass slug and the first mold half, at least while the glass slug is being fed in, is reduced while still maintaining the first fluid cushion, and
the fluid, in order to produce the first fluid cushion, flowing through the first mold half, which comprises a porous material which is permeable to the fluid.

The first mold half, which has the fluid flowing through it at least in a subregion, preferably in the region of a hollow or recess in the first mold half, allows the fluid for forming the gas cushion to flow out uniformly, distributed over that surface of the porous region of the mold half with the fluid flowing through it which faces the glass slug.

The through-flow of the fluid between the glass slug and the first mold half is set and reduced in particular as a function of the viscosity and the geometry of the glass slug.

The maximum through-flow, which is to be set at the start of the infeed, is to be set in such a manner that the glass slug which has been fed in can form a gob without coming into contact with the mold half. In this context, on account of the porosity of the mold half and the associated uniform emergence of the fluid via extremely finely distributed openings, a high through-flow out of the mold half is possible without the fluid flowing through the glass slug, thereby rendering the gob unusable.

The starting value for the through-flow is substantially determined by the viscosity of the glass slug during the infeed. The profile used to reduce the through-flow depends on the geometry of the gob and the profile of the viscosity of the glass slug during the infeed and cooling. For example, the through-flow can be reduced more quickly and to a lower level for gobs with a slight convex geometry compared to gobs of the same volume with a more pronounced convex geometry.

The viscosity represents a materials property of the glass and is dependent on the chemical composition of the glass. The viscosity is highly temperature-dependent, and the viscosity-temperature curve has fundamentally the same characteristic, substantially continuous profile for all glasses. The viscosities range from <10 dPa*s (melt) to $10^{13}$ dPa*s at room temperature. In practice, a distinction is often drawn between three viscosity ranges, namely the melting range, the working range and the freezing range.

In the context of the present invention, the term low-viscosity glasses is used to denote glasses whereof the melting range is from 700° C. to 1500° C. and the working range is from 500° C. to 1100° C. Glasses of this type include, for example, phosphate glasses, fluorophosphate glasses, Fluorglas, lanthanum glasses and heavy flint glasses.

The feeding of the glass slug into the levitation mold, i.e. into the first mold half, preferably takes place at a viscosity of the glass slug within the melting range, and in particular low-viscosity glass slugs are fed in using a needle feeder at a viscosity of <$10^2$ dPa*s.

In an advantageous embodiment of the process according to the invention, the through-flow of the fluid between the glass slug and the first mold half, when using low-viscosity glass slugs, is reduced from 20 l/min (under standard conditions) to a minimum level which is sufficient to maintain the fluid cushion.

The reduction in the through-flow may take place both continuously and discontinuously.

The setting and reduction of the through-flow can be effected, for example, using a proportional control valve, preferably such that the gap between the glass slug and the first mold half is minimized as far as possible, with the glass slug resting in a stationary position in the mold half, thereby setting a good gob roundness.

Furthermore, it is possible for the through-flow of the fluid between the glass slug and the first mold half to be increased again during the cooling of the glass slug, preferably once a viscosity of the glass slug in the region of the Littleton point has been reached. The Littleton point is also known as the softening point. The viscosity in the region of the Littleton point is approx. $10^{7.6}$ dPa*s.

In a further advantageous embodiment, the glass slug is fed into the first mold half using a needle feeder. For this purpose, the first mold half is arranged beneath the feeder nozzle, and the molten glass slug flowing vertically downward is caught in the first mold half, with the distance between the tip of the feeder nozzle and the top side of the glass slug being kept constant.

The glass slug is added in portions in a manner which is known to the person skilled in the art. To assist with detachment of the glass slug, the distance between the tip of the feeder nozzle and the top side of the glass slug can be increased when the infeed ends.

The infeed can also be effected using other portioning methods, in particular including those which leave no cut mark.

In a further advantageous configuration of the process according to the invention, a second fluid cushion is produced between the top side of the glass slug and a fluid-permeable second mold half after the glass slug has been fed in.

For this purpose, the first mold half can, for example, be moved from the feeder nozzle to the second mold half, so that the first mold half is arranged accurately below the second mold half, at the required distance.

The second fluid cushion can be used both to optimize the cooling of the glass slug, thereby avoiding undesirable shrinkage, and to shape the top side of the gob.

Moreover, this allows the gob to be fixed between the two fluid cushions, so that the gob rests in a stationary position in the mold and does not move about, with the result that good roundness is likewise ensured. This is advantageous in particular if the process is carried out using a rotary installation and the gobs in the molds on the rotary installation would be rocked about as a result of the rotor being constantly started up and decelerated.

The second mold half preferably likewise comprises a porous material which is permeable to the fluid, in particular the same porous material as the first mold half.

It is preferable for purified, technical-grade gases, in particular purified air, to be used as fluids for generating the first and/or second fluid cushion.

It is preferable for the first mold half and/or the second mold half to have a permeability k of from $1*10^{-14} m^2$ to $30*10^{-14} m^2$ for the fluid. In general, the fluid does not flow through the entire mold perpendicular to the mold surface, but rather flows primarily through the mold region which is required to form the fluid cushion between glass slug and mold half.

The permeability is a measure of the flow of gases or liquids (fluids) through a porous body. The permeability k of a body is approximately defined by Darcy's law, whereby:

$$k=(q*\mu*1)/(\Delta p*A)$$

in which:
k=permeability,
q=flow rate of the fluid through the body,
µ=viscosity of the fluid,
Δp=pressure drop in the fluid as it flows through the body,
l=length of the body in the direction in which the fluid flows through it, and
A=cross-sectional area of the body through which the fluid flows,
under approximately laminar flow conditions, a constant pressure and a constant temperature. The permeability of a body with a predetermined geometry is constant for a fluid of predetermined viscosity.

In the event of a reduction in the flow rate of the fluid through the body, a proportional change in the pressure drop in the fluid as it flows through the body is observed.

It is preferable for the porous material used to be a sintered material. In the context of the present invention, the term sintered materials is to be understood as encompassing powder metallurgy products which have been consolidated from pulverized metals to form bodies. The sintering provides the body with its strength. The targeted selection of grain size, grain size distribution, bulk density, grain surface area and molar mass sets the porosity of the sintered body and therefore its permeability.

Sintered materials based on the corrosion-resistant and heat-resistant chromium-nickel alloys, nickel-copper alloys and/or nickel-chromium-molybdenum alloys, in particular Inconel 600, or porous nonoxidic ceramics, in particular SiC, $Si_3N_4$ or graphite, which have a suitable porosity for gases, in particular for air, a high thermal stability such that they are able to withstand temperatures of at least 400° C. and a sufficient dimensional stability and compressive strength, are particularly suitable.

The top side of the gob can contract as a result of the volumetric shrinkage of the glass slug during cooling. A concave surface may form, which if it is excessively pronounced makes the gob unsuitable for the subsequent pressing process.

In further advantageous configurations of the process, to optimize the cooling process and to avoid the surface contraction, the glass slug is actively cooled after it has been fed in. This active cooling can be effected, for example, via the second mold half described above, through which a cooling gas is passed, or using an air shaper.

Further options for optimizing the cooling are for the gob to be sprayed with a mist of water or to change the atmospheric humidity in the vicinity of the gob.

High-melting glasses cool more quickly, on account of thermal radiation. To keep the temperature difference between the inner region of a glass slug composed of a high-melting glass and the outer region of this glass slug at a low level during cooling, and thereby to avoid high stresses in the gob and resultant formation of cracks and damage, it is advantageous for glass slugs of this type to be heated from above after they have been fed in.

For this purpose, by way of example, an IR radiant heater or a convection heater can be positioned above the glass slug. Furthermore, it is possible for a surface which reflects the thermal radiation of the glass slug or a refractory insulating cover to be arranged above the gob.

BRIEF DESCRIPTION OF THE SEVERAL VIEWS OF THE DRAWINGS

The invention is explained below on the basis of an exemplary embodiment. In the associated drawing:

FIG. 2 shows the through-flow profile as a function of the viscosity of the glass while the glass slug is being fed in.

DETAILED DESCRIPTION OF THE INVENTION

The process according to the invention is described by way of example on the basis of the production of a gob from a lanthanum heavy flint glass, for example from Schott Glass N-LaSF43. The diameter of the gob to be produced is 15 mm, and its height 7 mm, the gob having a volume of 0.9 $cm^3$. Gobs typically have a volume of between 0.1 $cm^3$ and 5 $cm^3$, a diameter of approx. 4 mm to 40 mm and a minimum thickness of 5 mm.

Gobs of this type are suitable, for example, for the precise-pressing of lenses or other optical elements for applications in digital cameras or digital projectors.

Figure 1:
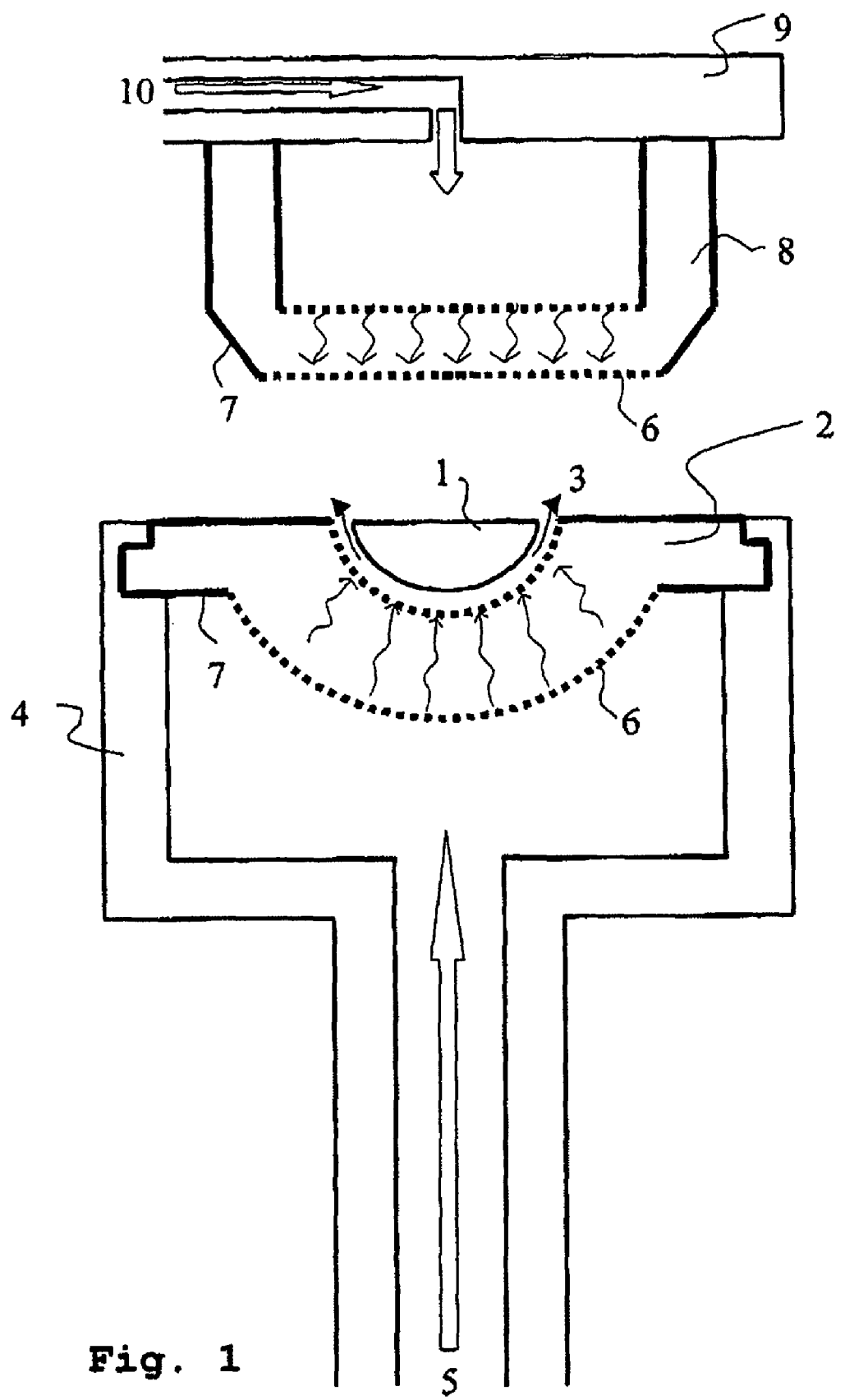
FIG. 1 diagrammatically depicts a glass slug which has been fed into a first mold half, with cooling from above.

The gob is produced in a first mold half 2, which is diagrammatically depicted in FIG. 1. The first mold half 2 is designed as a levitation mold and is secured to the molding station 4. The molding station 4 is arranged on a rotary installation (not shown) such that it can move in the vertical direction, with a plurality of molding stations 4 located on the rotary installation. The rotary installation transports the molding stations 4 to the various process stations, such as for example infeed of the glass slug 1, cooling and shaping of the glass slug 1 and removal of the gob. FIG. 1 shows the molding station 4 in the position of cooling and shaping of the glass slug 1 which has been fed in.

The first mold half 2 consists of Inconel 600, SIKA IL-05 IS, produced by GKN Sinter Metals. The first mold half 2 has gas-permeable surface regions 6 and gas-impermeable surface regions 7.

These regions can be produced by suitable surface treatment of the mold. The permeable surface regions 6 correspond to the hollow or recess of the first mold half 2. This is the surface region which is the maximum required to allow a gas cushion 3 to be formed between a glass slug 1 that is to be fed in and the first mold half 2.

It is likewise possible to realize a permeable surface region 6 which is central in the hollow but does not completely cover the hollow and a correspondingly enlarged impermeable surface region 7. In the region through which the fluid flows, defined by the permeable surface regions 6, the first mold half 2 has a constant thickness and the fluid flows through it substantially perpendicular to the surface of the hollow. The hollow is designed to match the desired shape of the gob to be produced.

To form the gas cushion 3, purified and oil-free air is fed under pressure to the molding station 4 via a gas feed line 5 and flows through the first mold half 2.

FIG. 1 also shows active cooling of the glass slug 1. This is effected by a cooling station 9 with a second mold half 8 located above the molding station 4. The second mold half 8 consists of stainless steel 1.4404, SIKA R-1 IS, produced by GKN Sinter Metals. The second mold half 8 likewise has gas-permeable surface regions 6 and gas-impermeable surface regions 7. These regions are surface regions of the second mold half 8 running parallel to the molding station 4. In the region through which fluid flows, defined by the permeable surface regions 6, the second mold half 8 has a constant thickness and fluid flows substantially perpendicularly through it.

Purified and oil-free air under pressure is likewise supplied to the cooling station 9 for cooling purposes via a gas feed line 10.

Process Sequence

The molding station 4, which is located on a rotary installation and includes the first mold half 2, is positioned beneath a needle feeder, with the molding station 4 also being moved vertically upward toward the needle feeder.

Pressurized, purified and oil-free air is fed to the molding station 4 via the gas feed line 5, and at the same time the glass slug 1 is fed in at a viscosity of <10 dpas.

A starting value for the through-flow of the air between glass slug 1 and first mold half 2 of 20 l/min (under standard conditions) is set by means of a proportional control valve which controls the gas supply.

As the glass slug 1 continues to be fed in, firstly the through-flow is reduced, with the gas cushion 3 which forms immediately between glass slug 1 and the first mold half 2 being maintained, and secondly the molding station 4 is moved vertically downward, so that the distance between the tip of the needle feeder and the top side of the glass slug 1 remains constant during the infeed.

To end the infeed and to assist with detachment of the glass slug 1, this distance is increased by lowering the molding station 4 further.

Figure 2:
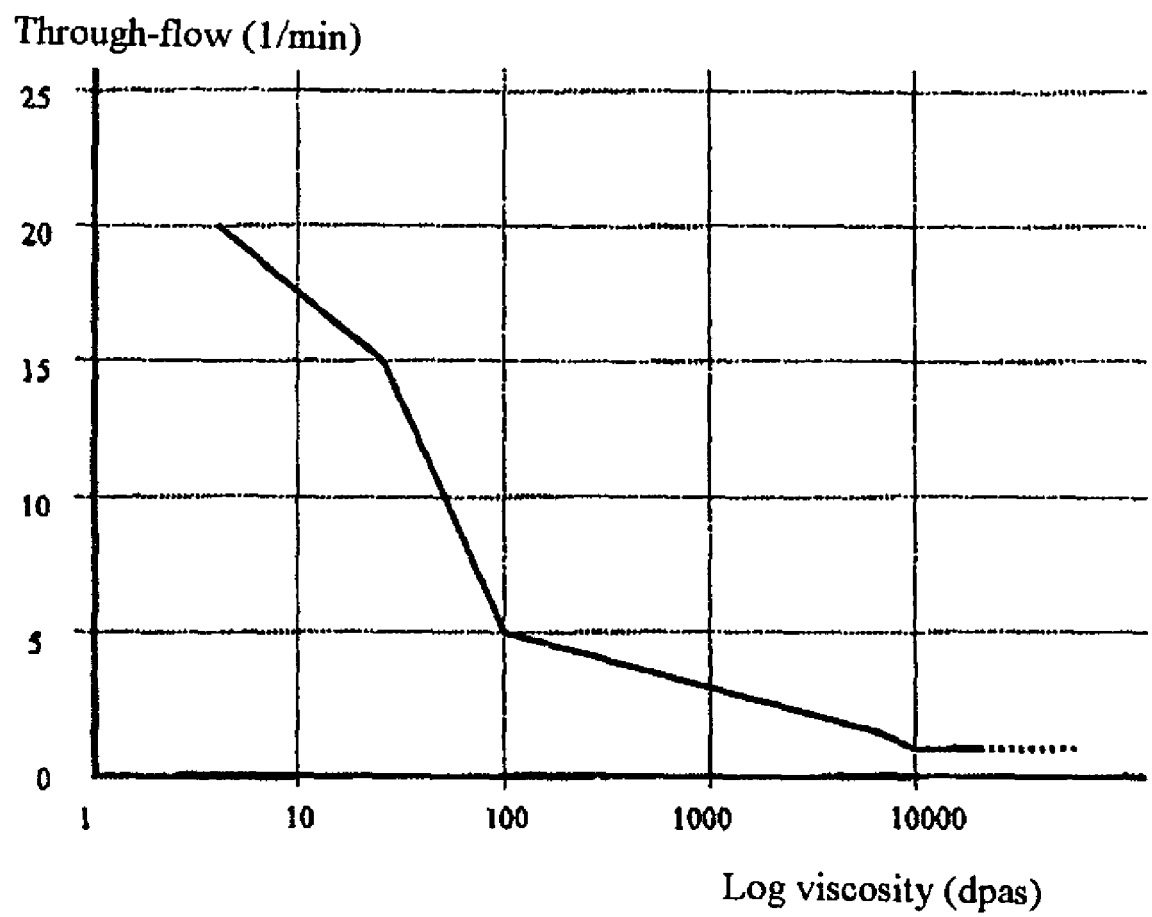

The control and lowering of the through-flow during the infeed is carried out, for the gob to be produced as described above, in accordance with the curve illustrated in FIG. 2 as a function of the viscosity of the glass slug 1.

After the infeed of the glass slug 1 has ended, through-flow is kept at a level of approximately 1 l/min (under standard conditions).

After the infeed has ended, the rotary installation is moved onward and the molding station 4 with the glass slug 1 positioned on the gas cushion 3 in the first mold half 2 is positioned beneath the cooling station 9.

For cooling purposes, an air quantity of 10 l/min is fed to the cooling station 9 via the gas feed line 10 and flows through the second mold half 8 in the direction of the top side of the glass slug, cooling this top side.

After a viscosity of the glass slug 1 of $10^{13}$ dpa*s has been reached, the glass slug 1 can be removed from the first mold half 2.

LIST OF DESIGNATIONS

1 Glass slug
2 First mold half
3 Gas cushion
4 Molding station
5 Gas feed line to the molding station
6 Permeable surface
7 Impermeable surface
8 Second mold half
9 Cooling station
10 Gas feed line to the cooling station The invention is claimed:

1. A process for producing fire-polished gobs, comprising:
   feeding a molten glass slug into a first mold half, said first mold half comprising a first porous material that is permeable to a through-flow of a fluid;
   setting said through-flow to a first through-flow at a start of said feeding of said molten glass slug, said first through-flow being sufficient to produce a fluid cushion between said first mold half and said molten glass slug and to cool said molten glass slug;
   reducing said through flow from said first through-flow to a second through-flow while feeding said molten glass slug, said first through-flow being higher than said second through-flow, said second through-flow being sufficient to maintain said fluid cushion; and
   feeding an actively cooled cooling fluid through a second mold half onto a top side of said molten glass slug to cool said top side and to form a second fluid cushion between said top side and said second mold half.

2. The process as claimed in claim 1, wherein reducing said through-flow comprises reducing said through-flow as a function of a viscosity and/or geometry of said molten glass slug.

3. The process as claimed in claim 1, wherein feeding said molten glass slug comprises feeding said molten glass slug with a viscosity of less than $10^2$ decipascal seconds.

4. The process as claimed in claim 3, wherein reducing through-flow comprises reducing said through-flow from 20 liters/minute under standard conditions to a minimum level that is sufficient to maintain said fluid cushion.

5. The process as claimed in claim 1, wherein cooling said molten glass slug further comprises increasing said through-flow of said fluid cushion.

6. The process as claimed in claim 5, wherein increasing said through-flow comprises increasing said through-flow when a viscosity of said molten glass slug is in a region of the Littleton point.

7. The process as claimed in claim 1, wherein feeding said molten glass slug comprises feeding said molten glass slug using a needle feeder.

8. The process as claimed in claim 7, wherein said needle feeder has a tip of a feeder nozzle with a distance to a top side of said molten glass slug that is constant.

9. The process as claimed in claim 7, wherein said needle feeder has a tip of a feeder nozzle with a distance to said top side of said molten glass slug, further comprising increasing said distance after feeding said molten glass slug.

10. The process as claimed in claim 1, wherein said second mold half is made of a second porous material having at least one subregion that is permeable to said actively cooled cooling fluid.

11. The process as claimed in claim 10, wherein said second porous material is a sintered material.

12. The process as claimed in claim 11, wherein said sintered material is selected from the group consisting of corrosion-resistant chromium-nickel alloys, heat-resistant chromium-nickel alloys, nickel-copper alloys, nickel-chromium-molybdenum alloys, Incbnel 600, nonoxidic ceramic sintered material, and any combination thereof.

13. The process as claimed in claims 1, wherein said fluid is a purified technical-grade gas.

14. The process as claimed in claim 13, wherein said purified technical-grade gas is purified air.

15. The process as claimed in claim 1, wherein said first mold half has a permeability of in a range of $1*10^{-14}m^2$ to $30*10^{-14}m^2$.

16. The process as claimed in claim 1, wherein said first porous material is a sintered material.

17. The process as claimed in claim 16, wherein said sintered material is selected from the group consisting of corrosion-resistant chromium-nickel alloys, heat-resistant chromium-nickel alloys, nickel-copper alloys, nickel-chromium-molybdenum alloys, Inconel 600, nonoxidic ceramic sintered material, and any combination thereof.

18. The process as claimed in claim 1, wherein feeding said molten glass slug further comprises heating said molten glass slug from above after feeding said molten glass slug in said first mold half.

19. The process as claimed in claim 18, wherein heating said molten glass slug comprises heating said molten glass slug by IR radiant heating.

20. The process as claimed in claim 18, wherein heating said molten glass slug comprises heating said molten glass slug by convection heating.

21. The process as claimed in claim 18, wherein heating said molten glass slug comprises heating said molten glass slug by a reflector that reflects a thermal radiation of said molten glass slug.

22. The process as claimed in claim 1, wherein said second mold half has a permeability in a range of $1*10^{-14}m^2$ to $30*10^{-14}m^2$.

23. The process as claimed in claim 1, wherein reducing said first through-flow to said second through-flow maintains said first fluid cushion so that said molten glass slug forms a gob without coming into contact with said first mold half.

24. A process for producing fire-polished gobs, comprising:
- passing a fluid through a first mold half to form a first fluid cushion while a glass slug is being fed in and cooled;
- reducing a through-flow of the fluid between the glass slug and the first mold half at least while the glass slug is being fed in while still maintaining the first fluid cushion; and
- passing an actively cooled cooling fluid through a second mold half to cool a top side of the glass slug while still maintaining the first fluid cushion.

* * * * *